(12) United States Patent
Shimakawa

(10) Patent No.: US 9,760,708 B2
(45) Date of Patent: Sep. 12, 2017

(54) INFORMATION PROCESSING APPARATUS, INFORMATION PROCESSING SYSTEM, INFORMATION PROCESSING METHOD, AND PROGRAM

(71) Applicant: Sony Corporation, Tokyo (JP)

(72) Inventor: Masato Shimakawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/383,603

(22) PCT Filed: Jan. 26, 2013

(86) PCT No.: PCT/JP2013/000390
§ 371 (c)(1),
(2) Date: Sep. 8, 2014

(87) PCT Pub. No.: WO2013/145517
PCT Pub. Date: Oct. 3, 2013

(65) Prior Publication Data
US 2015/0101032 A1    Apr. 9, 2015

(30) Foreign Application Priority Data

Mar. 28, 2012  (JP) ................ 2012-073374

(51) Int. Cl.
*G06F 7/04* (2006.01)
*G06F 15/16* (2006.01)
(Continued)

(52) U.S. Cl.
CPC .............. *G06F 21/41* (2013.01); *G06F 21/44* (2013.01); *G06F 21/62* (2013.01);
(Continued)

(58) Field of Classification Search
CPC .......... G06F 21/41; G06F 21/44; G06F 13/37; G06F 21/62; G06F 21/6218;
(Continued)

(56) References Cited

U.S. PATENT DOCUMENTS 8,533,796 B1 * 9/2013 Shenoy ............... H04L 63/0815
380/229
8,544,069 B1 * 9/2013 Subbiah .................. G06F 21/41
340/5.8

(Continued)

FOREIGN PATENT DOCUMENTS

| JP | 2011-155545 A | 8/2011 |
|---|---|---|
| WO | WO 2011/080874 A1 | 7/2011 |
| WO | WO 2012/017561 A1 | 2/2012 |

OTHER PUBLICATIONS

Ogura et al., Proposal of secure data/service collaboration method among public clouds. The Institute of Electronics Information and Communication Engineers Technical Report. Jul. 2011;111(146):69-74.
Watanabe et al., An investigation of the platform technology for mobile terminals. The Journal of the Institute of Electronics Information and Communication Engineers. Sep. 2011;94(9):827-843.

*Primary Examiner* — Jayesh Jhaveri
(74) *Attorney, Agent, or Firm* — Chip Law Group

(57) ABSTRACT

[Object] To reduce the trouble of the authentication process necessary for cooperation between a plurality of devices or network services.
[Solving Means] An information processing apparatus includes a communication unit, a storage unit, and a controller. The communication unit communicates with a first device, a second device, and a service on a network, the service having a resource on a user of the first device. The controller controls the communication unit so that the communication unit transmits, based on a request for obtaining an access right to the resource from the first device and permission information representing permission by the user (Continued)

with respect to the obtaining of the access right, a request for issuing an access token to the service, the access token representing the access right, and receives, from the service, the access token issued by the service. Moreover, the controller controls the storage unit so that the storage unit stores the received access token safely, and the communication unit so that the communication unit accesses the resource using the stored access token in response to a request from the second device associated with the user.

12 Claims, 13 Drawing Sheets

(51) Int. Cl.
    *G06F 17/30*     (2006.01)
    *H04L 29/06*     (2006.01)
    *G06F 21/41*     (2013.01)
    *G06F 21/62*     (2013.01)
    *G06F 21/44*     (2013.01)
    *H04L 9/32*     (2006.01)

(52) U.S. Cl.
    CPC ........ *G06F 21/6218* (2013.01); *H04L 9/3226* (2013.01); *H04L 9/3228* (2013.01); *H04L 63/08* (2013.01); *H04L 63/0815* (2013.01)

(58) Field of Classification Search
    CPC . H04L 63/0815; H04L 9/3226; H04L 9/3228; H04L 63/08
    See application file for complete search history.

(56) References Cited

U.S. PATENT DOCUMENTS

| | | | |
|---|---|---|---|
| 8,996,887 B2* | 3/2015 | Kadatch | G06F 21/554 380/278 |
| 2006/0119883 A1* | 6/2006 | Lovat | G06F 9/4445 358/1.15 |
| 2008/0072301 A1* | 3/2008 | Chia | H04L 63/0815 726/8 |
| 2009/0007250 A1* | 1/2009 | Pouzin | G06F 21/335 726/10 |
| 2010/0212004 A1* | 8/2010 | Fu | G06F 21/6218 726/9 |
| 2012/0144024 A1* | 6/2012 | Lee | G06F 21/41 709/224 |
| 2012/0144202 A1* | 6/2012 | Counterman | G06F 21/335 713/176 |
| 2012/0266229 A1* | 10/2012 | Simone | G06F 21/41 726/9 |
| 2012/0291109 A1 | 11/2012 | Minamizawa | |
| 2013/0007846 A1* | 1/2013 | Murakami | H04W 12/08 726/4 |
| 2013/0047249 A1* | 2/2013 | Radhakrishnan | H04L 63/0807 726/12 |
| 2014/0026193 A1* | 1/2014 | Saxman | G06F 21/33 726/4 |
| 2014/0040993 A1* | 2/2014 | Lorenzo | G06F 21/41 726/4 |
| 2015/0026261 A1* | 1/2015 | Shimakawa | G06Q 10/10 709/204 |

* cited by examiner

INFORMATION PROCESSING APPARATUS, INFORMATION PROCESSING SYSTEM, INFORMATION PROCESSING METHOD, AND PROGRAM

TECHNICAL FIELD

The present technology relates to an information processing apparatus that is capable of communicating with another information processing apparatus through a network, an information processing system including the information processing apparatus, an information processing method for the information processing apparatus, and a program.

BACKGROUND ART

From the past, in the case where a plurality of devices and various kinds of network services operate in cooperation with each other through a network, user authentication therefor has been processed in the following way.

(1) The concept of user is eliminated, and devices/services freely cooperate with each other (e.g. DLNA (Digital Living Network Alliance)).

(2) A device that performs control performs user authentication on a device/service at user's hand, which is controlled, and the device/service that is controlled does not perform user authentication (Remote reservation for TV program recording apparatus).

(3) Although a user authentication process is executed via another device, a user ID/password is input for each device/service every time the device/service cooperation function is used (e.g., network file sharing on PC).

(4) In (3) above, the ID/password for another device/service, which has been input once, is stored in the device at user's hand, and automatically used from the next time.

However, the method such as (1) and (2) above causes a security problem in the case where user data exists on a device/service to be controlled. On the other hand, in the method such as (3) above, because the user has to input an ID/password every time for each device to be controlled, the convenience is lost. Moreover, in the case where many devices are treated, the method is impractical. Furthermore, in the method such as (4), important information such as user's password is stored in the individual device, which causes a security problem. Even if the information is encrypted, the same problem is caused in the case where it is decoded because it is stored in a form that can be decrypted to the original form.

In addition, from the past, various protocols for a service to be able to use a function of another service without being directly given a user's ID/password that is managed therein have been proposed to easily create a mashup between network services. Examples of a typical protocol therefor include Oauth, which has been used in a service such as Facebook (registered trademark). In Oauth, a service provider that manages a user's ID/password transfers the access right to the service provider to a service (consumer) that uses the function thereof without providing any ID or password (see, for example, Patent Document 1).

Furthermore, such a protocol is useful when a service on a network is used from a device because it does not need to store a user's ID/password, and is used by many applications such as PC and smartphone.

CITATION LIST

Patent Document

Patent Document 1: Japanese Patent Application Laid-open No. 2011-155545

DISCLOSURE OF THE INVENTION

Problem to be Solved by the Invention

However, the protocol has such a limitation that it cannot be used from a device with no input/output function such as a display and a keyboard that play a role of UX (User Experience) thereof, because such a function is necessary when user authentication is performed.

In addition, in the case where the user has a plurality of devices, he/she has to perform, for each device, an authentication procedure for using the same service. As in the method of (3) above, it takes a lot of trouble and is not practical. Furthermore, the access right obtained by authentication normally has an expiration date. Therefore, it needs to perform authentication again in the case where the expiration date has been reached, and thus there is a need to repeat the authentication procedure frequently.

In view of the circumstances as described above, the object of the present technology is to provide an information processing apparatus, an information processing system, an information processing method, and a program that are capable of reducing the trouble of the authentication process necessary for cooperation between a plurality of devices or network services.

Means for Solving the Problem

In order to solve the above-mentioned problem, an information processing apparatus according to an embodiment of the present technology includes a communication unit, a storage unit, and a controller. The communication unit is capable of communicating with a first device, a second device, and a service on a network, the service having a resource on a user of the first device. The controller is capable of controlling the communication unit so that the communication unit transmits, based on a request for obtaining an access right to the resource from the first device and permission information representing permission by the user with respect to the obtaining of the access right, a request for issuing an access token to the service, the access token representing the access right, and receives, from the service, the access token issued by the service. Moreover, the controller is capable of controlling the storage unit so that the storage unit stores the received access token safely.

With this configuration, because the information processing apparatus allows a plurality of devices to share the user's access token to the resource, it is possible to reduce the trouble of the authentication process necessary for cooperation between a plurality of devices or network services.

The controller may control the communication unit so that the communication unit accesses the resource using the stored access token in response to a request from the second device associated with the user.

Accordingly, the second device can access a network service using the access token obtained in the process performed by the first device and the information processing apparatus without an authentication process between the second device and the service.

The controller may control the communication unit so that the communication unit transmits the stored access token to the first device or the second device through a safe communication path.

Accordingly, because the first device or the second device can directly access the service using the received access token without the information processing apparatus, the burden of the information processing apparatus is reduced.

The information processing apparatus in which the first device includes an input device to which an operation necessary for the user to notify intention of the permission to the service is input and an output device that outputs a screen for the input, and the second device does not include the input device and the output device.

Accordingly, also a device that cannot display UX for user authentication and permission of obtaining the access right or receive any operation on the UX can access the service using the access token.

The controller may control the communication unit so that the communication unit receives, from the first device, association information that represents association with the user, the first device, and the second device, and the storage unit so that the storage unit stores the received association information.

Accordingly, because it is assured that the first device and the second device are associated with each other by the same reliable user, the safety when the access token is transmitted in response to a request from the second device is ensured.

An information processing system according to another embodiment includes a server apparatus and an information processing apparatus. The server apparatus includes a first communication unit, a storage unit, and a first controller. The first communication unit is capable of communicating with a user device and a service on a network, the service having a resource on a user of the first device. The first controller is capable of controlling the first communication unit so that the first communication unit transmits, based on a request for obtaining an access right to the resource from the user device and permission information representing permission by the user with respect to the obtaining of the access right, a request for issuing an access token to the service, the access token representing the access right, and receives, from the service, the access token issued by the service. Moreover, the first controller is capable of controlling the storage unit so that the storage unit stores the received access token safely.

The information processing apparatus includes a second communication unit and a second controller. The second communication unit is capable of communicating with the server apparatus and the service. The second controller is capable of controlling the second communication unit so that the second communication unit receives the stored access token from the server apparatus through a safe communication path, and accesses the resource using the received access token.

An information processing method according to still another embodiment includes receiving, from a first device, a request for obtaining an access right to a resource on a user of the first device, and permission information, a service on a network having the resource, the permission information representing permission by the user with respect to the obtaining of the access right. To the service, a request for issuing an access token representing the access right is transmitted. From the service, the access token issued by the service is received. The received access token is stored safely.

A program according to still another embodiment causes an information processing apparatus to execute the steps of a first receiving step, a first transmitting step, a second receiving step, and a storing step. In the first receiving step, from a first device, a request for obtaining an access right to a resource on a user of the first device, and permission information are received, a service on a network having the resource, the permission information representing permission by the user with respect to the obtaining of the access right. In the first transmitting step, to the service, a request for issuing an access token representing the access right is transmitted. In the second receiving step, from the service, the access token issued by the service is received. In the storing step, the received access token is stored safely.

Effect of the Invention

As described above, according to the present technology, it is possible to reduce the trouble of the authentication process necessary for cooperation between a plurality of devices or network services.

MODE(S) FOR CARRYING OUT THE INVENTION

Hereinafter, embodiments according to the present technology will be described with reference to the drawings.

First Embodiment

A first embodiment of the present technology will be described first.

[Network Configuration of System]

Figure 1:
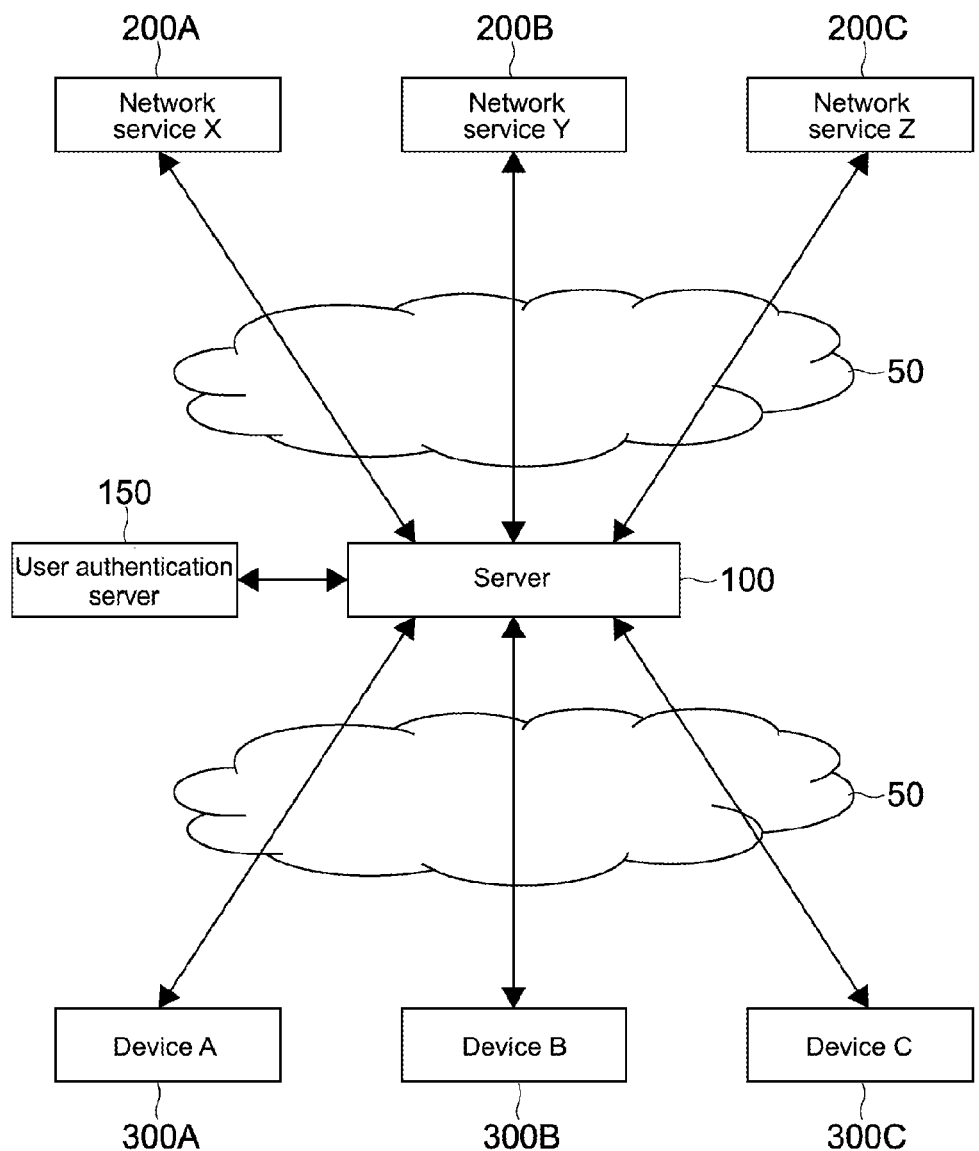
FIG. 1 A diagram showing a network configuration of a system in a first embodiment of the present technology.

FIG. 1 is a diagram showing a network configuration of a system according to this embodiment.

As shown in the figure, this system includes a server 100 on a cloud, a network service 200, and a device 300. These are capable of communicating with each other by a WAN 50. A plurality of network services 200 and a plurality of devices 300 may exist.

The server 100 mediates communication between the plurality of devices 300 and has a function of receiving a transfer of an access right (access token) to the network service 200 of a user of the device 300 and managing the access token.

To the server 100, a user authentication server 150 is connected. The user authentication server 150 performs a user authentication process with a user ID and password in response to a request from the server 100, in an association process with each device 300 and the user, which will be described later.

The network service 200 provides a network service to another device (the server 100, the device 300, or the like). In addition, the network service 200 performs a service authentication process by providing a service authentication mechanism for providing a service, presenting the requested access content to the user via the device 300, and obtaining permission from the user. In the figure, only three network services 200A to 200C are shown. However, the number of the network services 200 may be four or more.

The device 300 may be any information processing apparatus such as smartphone, mobile phone, tablet PC (Personal Computer), desktop PC, notebook PC, PDA (Personal Digital Assistant), portable AV player, electronic book, digital still camera, camcorder, television receiver, PVR (Personal Video Recorder), game device, projector, car navigation system, digital photo frame, HDD (Hard Disk Drive) apparatus, healthcare device, and household appliance. In the figure, only three devices 300A to 300C are shown. However, the number of the devices 300 may be four or more.

[Hardware Configuration of Server]

Figure 2:
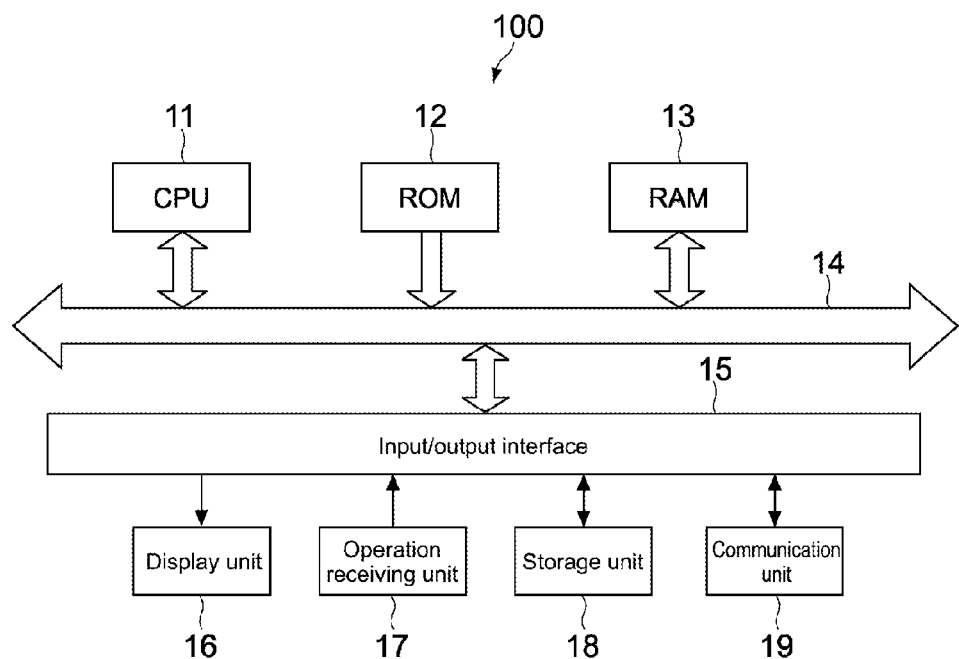
FIG. 2 A block diagram showing a hardware configuration of a server in the first embodiment.

FIG. 2 is a diagram showing a hardware configuration of the above-mentioned server 100. As shown in the figure, the server 100 includes a CPU (Central Processing Unit) 11, a ROM (Read Only Memory) 12, a RAM (Random Access Memory) 13, an input/output interface 15, and a bus 14 connecting them with each other.

The CPU 11 appropriately access the RAM 13 as necessary and collectively controls the entire blocks of the server 100 while performing various types of arithmetic processing in, for example, a process for obtaining the above-mentioned access token. The ROM 12 is a non-volatile memory in which firmware such as an OS executed by the CPU 11, programs, and various parameters is fixedly stored. The RAM 13 is used as a work area for the CPU 11 and the like, and temporarily stores the OS, various applications in execution, and various types of data being processed.

To the input/output interface 15, a display unit 16, an operation receiving unit 17, a storage unit 18, a communication unit 19, and the like are connected.

The display unit 16 is an output apparatus using an LCD (Liquid Crystal Display), an OELD (Organic ElectroLuminescence Display), or a CRT (Cathode Ray Tube), for example.

The operation receiving unit 17 is a pointing device such as a mouse, a keyboard, a touch panel, or another input apparatus. In the case where the operation receiving unit 17 is a touch panel, the touch panel may be integrated with the display unit 16.

The storage unit 18 is a nonvolatile memory such as an HDD and a flash memory such as SSD (Solid State Drive). In the storage unit 18, the OS, various applications, and various types of data are stored. In particular, in this embodiment, the storage unit 18 stores programs such as a plurality of software modules to be described later and an access token obtained from the network service 200. These programs may be provided to the server 100 via the WAN 50, or may be provided as a storage medium that can be read in the server 100.

The communication unit 19 is a NIC or the like for connecting to the WAN 50 and performs communication processing between the communication unit 19 and the device 300.

[Hardware Configuration of Device]

Figure 3:
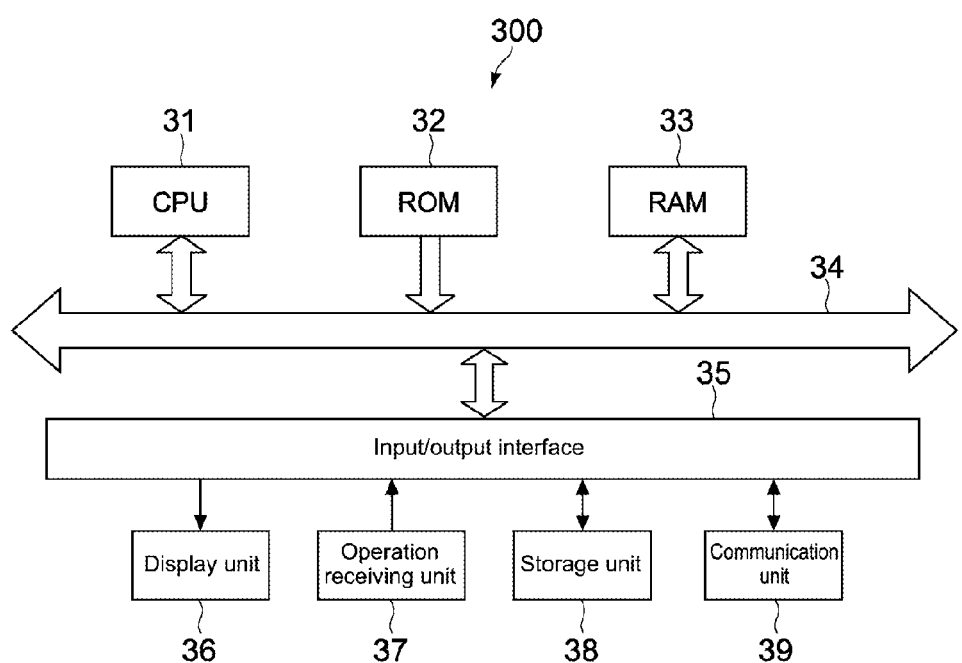
FIG. 3 A block diagram showing a hardware configuration of a device in the first embodiment.

FIG. 3 is a diagram showing a hardware configuration of the above-mentioned device 300. As shown in the figure, the hardware configuration of the device 300 is basically the same as the hardware configuration of the above-mentioned server 100. Specifically, the device 300 includes a CPU 31, a ROM 32, a RAM 33, input/output interface 35, and a bus 34 connecting them with each other, a display unit 36, an operation receiving unit 37, a storage unit 38, and a communication unit 39. Here, the display unit 36 may be incorporated into the device 300, or may be externally connected to the device 300.

The CPU 31 controls each block such as the storage unit 38 and the communication unit 39 to thereby perform a communication process with the server 100 or the network service 200 or various types of data processing.

In the storage unit 38, programs such as a plurality of software modules to be described later or various databases are stored. These programs may be provided to the device 300 via the WAN 50, or may be provided as a storage medium that can be read in the device 300.

In the case where the device 300 is a mobile device such as smartphone, the communication unit 39 may be a module for wireless communication such as wireless LAN.

In the case where the device 300 is a digital photo frame or a healthcare device (e.g., clinical thermometer, weight scale, blood pressure monitor, and pulsimeter), the operation receiving unit 37 is formed of a button or switch, and does not have a character inputting function such as a keyboard and a touch panel in some cases. Furthermore, the display unit 36 has no function of outputting UI of an application such as a browser in some cases even if a slide show of photographs or measured values can be displayed, similarly.

[Module Configuration of Server]

Figure 4:
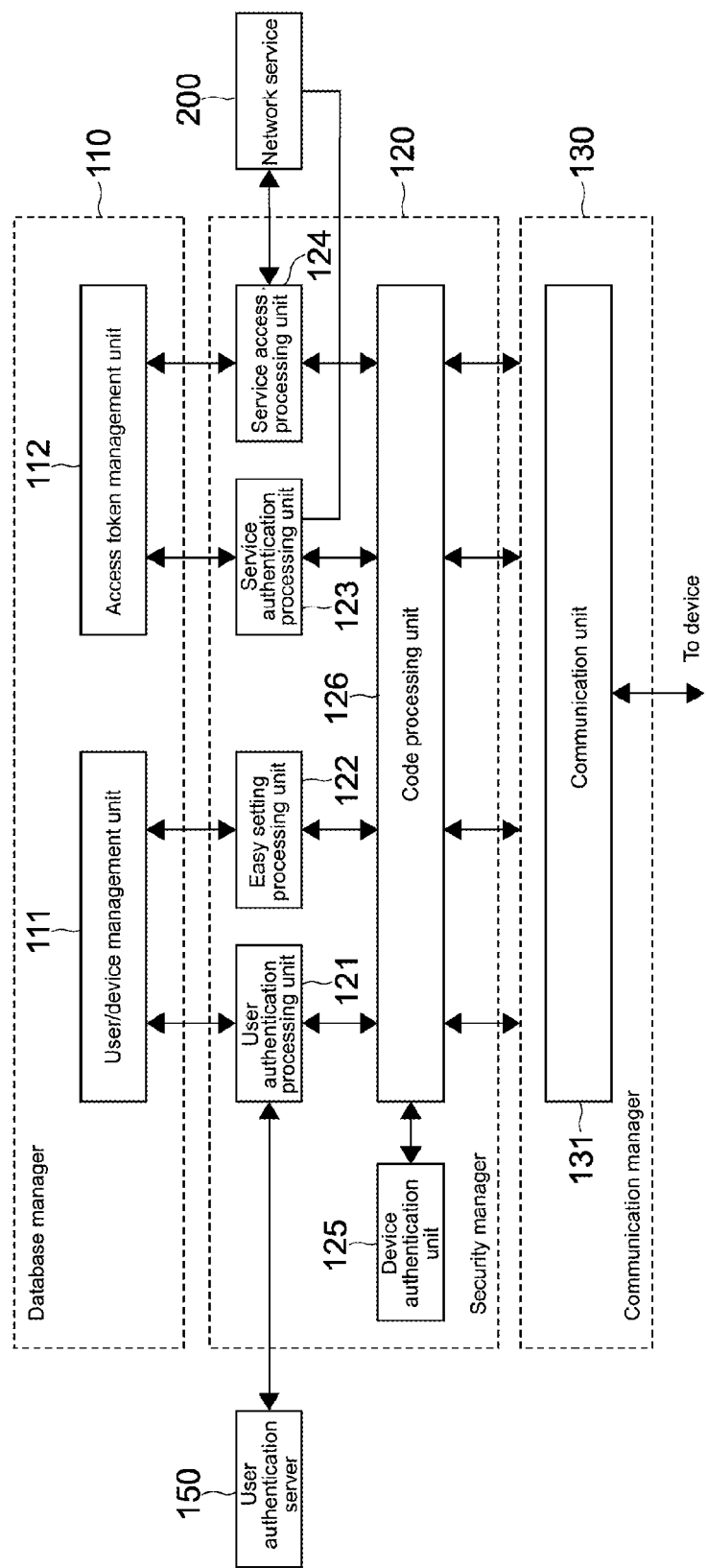
FIG. 4 A block diagram showing a software module configuration of the server in the first embodiment.

FIG. 4 is a diagram showing the configuration of a software module of the above-mentioned server 100. As shown in the figure, the server 100 includes modules managers of a database manager 110, a security manager 120, and a communication manager 130.

The database manager 110 manages databases of the server 100 collectively. The database manager 110 includes software modules of a user/device management unit 111 and an access token management unit 112.

The user/device management unit 111 manages the list of the device 300 for each user ID for uniquely identifying users of the device 300.

The access token management unit 112 manages the access token for accessing the resource of the various network services 200, which is obtained from the respective network services 200, for each user ID and for each service ID for uniquely identifying the network services 200.

The security manager 120 collectively deals with processes related to security in communication between the server 100, the device 300, and the network service 200. The security manager 120 includes software modules of a user authentication processing unit 121, an easy setting processing unit 122, a service authentication processing unit 123, a service access processing unit 124, a device authentication unit 125, and a code processing unit 126.

The user authentication processing unit 121 performs a user authentication process (the details will be described later) of the device 300 on the device-based security mechanism.

Here, the device-based security mechanism represents a mechanism in which mutual authentication is performed at the device level between the devices 300 or between the device 300 and the server 100, and a communication path for performing safe communication is established without a user. With this mechanism, processing units related to the security between the devices 300 or between the device 300 and the server 100 are connected with each other through a safe communication path, and function as one security system.

Specifically, the device-based security mechanism performs an authentication process in which a key/certificate is embedded in the device 300 and the server 100 in advance and, based on them, the device 300 and the server 100 are confirmed to be regular ones, and a key replacing process for generating a key that is used in subsequent communication.

The above-mentioned authentication process and the key replacing process are performed end-to-end regardless of the actual connection form. For example, in the case where the device 300A and the device 300B are connected with each other via the server 100, the authentication process and the key replacing process are performed in the device A and the device B although the devices 300A and 300B are not directly connected actually, and the server 100 simply mediates the processes by the communication unit 19.

The easy setting processing unit 122 uses the device 300 on which user authentication has been performed to set user information in a different device 300 on the above-mentioned device-based security mechanism, and regards the different device 300 as authenticated (association-set) device.

By the above-mentioned device-based security mechanism, in the case where the device 300A and the device 300B perform authentication, for example, the safety of the device and the communication path is ensured. Therefore, the server 100 can trust user information of the device 300A and set user information in the device B, thereby regarding the user authentication as being performed.

As a user interface for the setting process of user information, a user interface may be used in any form. In this embodiment, in the display unit 36 of the device 300A being a setting source, for example, a list of images or icons of other devices 300 that have been searched for by a device search process is displayed. When a user of the device 300 selects the image or icon by an operation such as clicking, touching, and surrounding, a setting request message is transmitted from the device 300A to the selected different device via the server 100. When an operation (e.g., pressing OK button) that represents intention to agree with the setting request is input to the different device, response information on the fact is transmitted to the device 300A being a setting source via the server 100. Then, when the response information is received, the display mode of the image or icon of the device that has been set in the list is changed in the display unit 36 of the device 300A. For example, the image or icon is surrounded by a frame, or the color of them is changed. Thus, the user can know that setting has been completed.

Because there is no need of a user interface for user authentication (inputting ID and keyword) for setting of user information by easy setting, a small-sized device having no display device or keyboard can be a setting target. Accordingly, the user performs user authentication with user ID and password by only one device and sets another device by the above-mentioned easy setting, thereby associating itself with various devices without a troublesome operation.

The service authentication processing unit 123 communicates with the network service 200 and performs a service authentication process in response to a request from the device 300, thereby obtaining the access token. The details of the service authentication process will be described later.

The service access processing unit 124 uses the obtained access token to access the network service 200 in response to a request from the device 300.

The device authentication unit 125 performs an authentication process of the device 300 as the above-mentioned device-based security mechanism.

The code processing unit 126 performs a coding process as a device-based security mechanism. That is, the exchange between the security manager 120 and another module is encrypted based on the device-based security mechanism. In addition, the security manager 120 is strongly protected on each device 300 and server 100 by, for example, a software tamper resistant process.

Accordingly, the security manager 120 on the plurality of devices 300 and the server 100, which is strongly protected, is connected with encrypted communication based on the device-based security mechanism. Therefore, the whole of them is regarded as one system.

The communication manager 130 includes a communication unit 131 serving as a software module. The communication unit 131 performs a communication process between the security manager 120 and the device 300.

[Module Configuration of Device]

Figure 5:
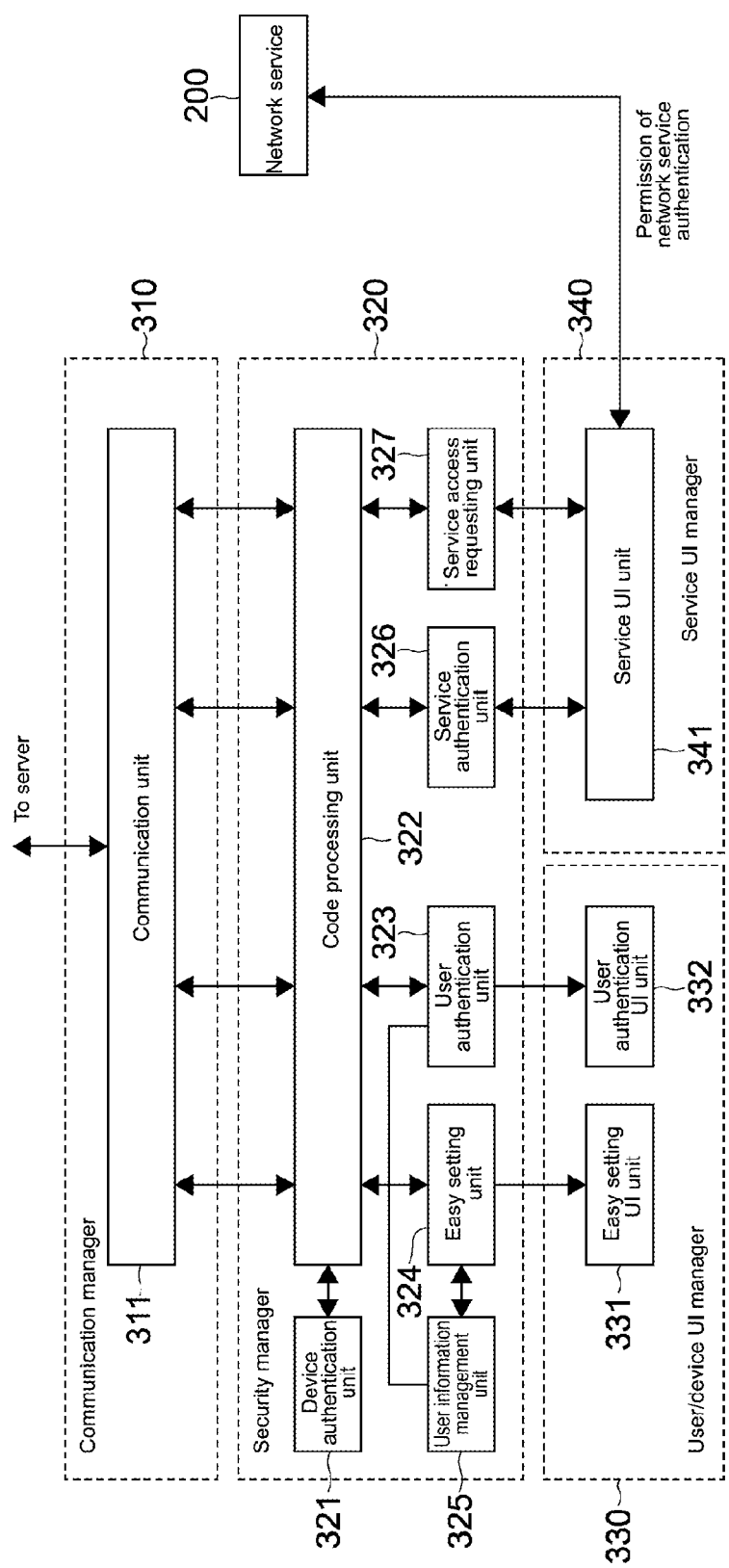
FIG. 5 A block diagram showing a software module configuration of the device in the first embodiment.

FIG. 5 is a diagram showing the configuration of a software module of the above-mentioned device 300. As shown in the figure, the device 300 includes module managers of a communication manager 310, a security manager 320, a user/device UI manager 330, and a service UI manager 340.

The communication manager 310 includes a communication unit 311 serving as a software module. The communication unit 311 performs a communication process between the security manager 320 and the server 100.

The security manager 320 includes software modules of a device authentication unit 321, a code processing unit 322, a user authentication unit 323, an easy setting unit 324, a user information management unit 325, and a service authentication unit 326.

The device authentication unit 321 performs device authentication as the above-mentioned device-based security mechanism.

The code processing unit 322 performs a coding process as the above-mentioned device-based security mechanism.

The user authentication unit 323 performs a user authentication process between the user authentication unit 323 and (the user authentication processing unit 121 of) the server 100 on the above-mentioned device-based security mechanism.

The easy setting unit 324 performs the above-mentioned easy setting process between the easy setting unit 324 and (the easy setting processing unit 122 of) the server 100 on the above-mentioned device-based security mechanism.

The user information management unit 325 manages the user ID that is associated with the device 300 by the above-mentioned easy setting process.

The service authentication unit 326 performs a process related to network service authentication between the service authentication unit 326 and the server 100 on the device-based security mechanism.

A service access requesting unit 327 performs a process related to the access to a network service between the service access requesting unit 327 and the server 100 on the device-based security mechanism.

The user/device UI manager 330 includes an easy setting UI unit 331 and a user authentication UI unit 341 serving as software modules.

The easy setting UI unit 331 generates and controls UI displayed on the display unit 36 for the above-mentioned easy setting process.

A user authentication UI unit 332 generates and controls UI displayed on the display unit 36 for the above-mentioned user authentication.

The service UI manager 340 includes a service UI unit 341 serving as a software module. The service UI unit 34 generates and controls UI displayed on the display unit 36 for authentication of and access to the network service 200.

Here, the above-mentioned user authentication process will be described. The user authentication process between the above-mentioned server 100 and the device 300 is performed in the following way.

First, the user authentication UI unit 332 receives a user ID and password from a user, and transmits them to the user authentication unit 323.

The user authentication unit 323 transmits the user ID and password to the user authentication processing unit 121 of the server 100 via the device-based security mechanism.

The user authentication processing unit 121 requests the user authentication server 150 to perform authentication. In the case where the authentication succeeds, the user authentication processing unit 121 transmits the user ID and device ID to the user/device management unit 111 and transmits the authentication result to the device 300.

The user/device management unit 111 adds, to the device list on the user database, the device ID received from the user authentication processing unit 121.

The user authentication unit 323 of the device 300, which has received the above-mentioned authentication result, transmits the user ID to the user information management unit 325 and causes the user information management unit 325 to store it.

[Operation of System]

Next, the operation of the server 100 and the device 300 in the system configured as described above will be described. In this embodiment and another embodiment, the operation of the server 100 and the device 300 is performed in cooperation with the CPU and the above-mentioned software module that is executed under control thereof.

(Network Service Authentication Process)

Figure 6:
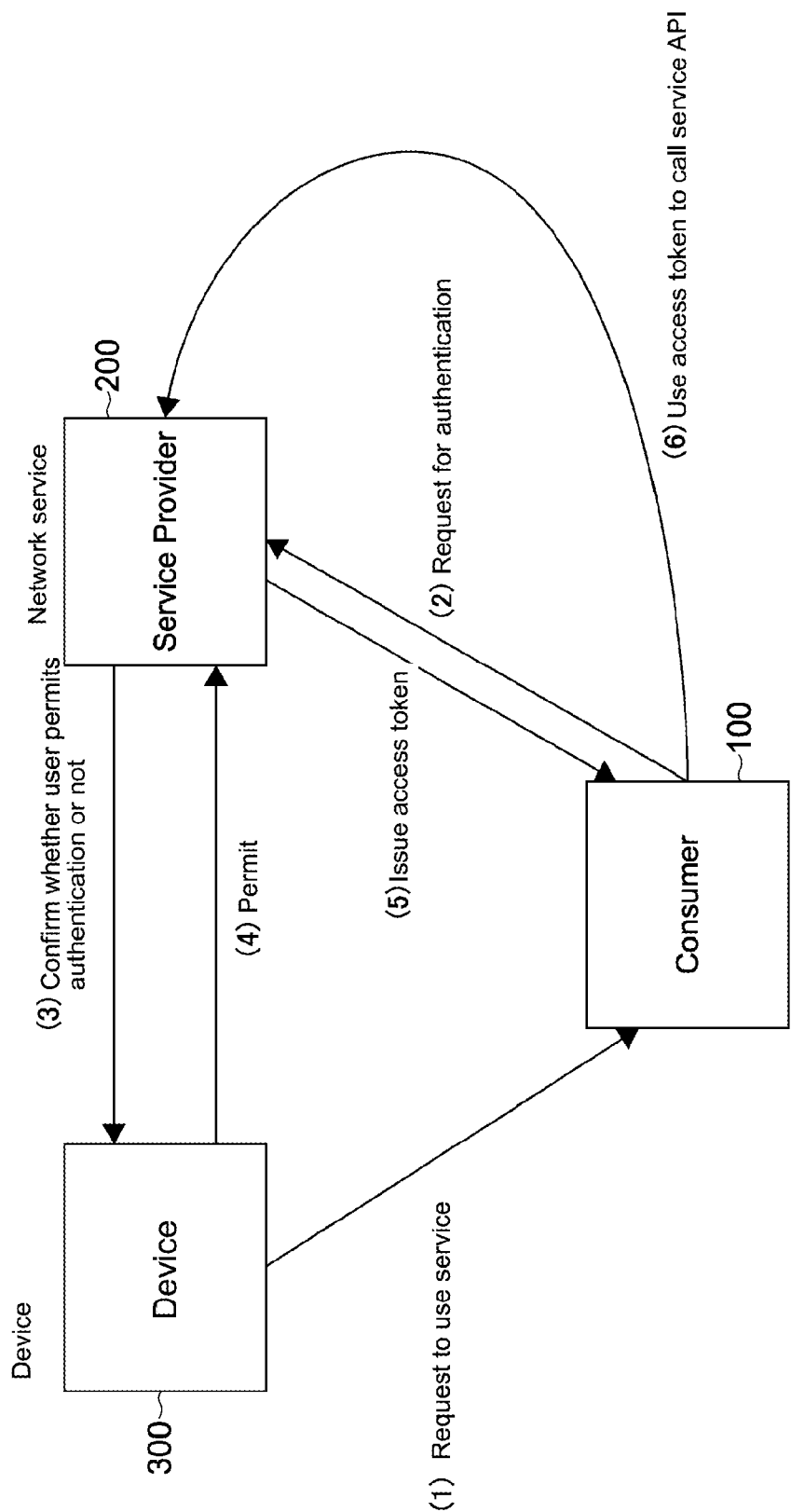
FIG. 6 A diagram showing an overview of network service authentication in the first embodiment.

First, the above-mentioned network service authentication process will be described. FIG. 6 is a diagram showing the overview of the network service authentication in this embodiment.

As an authentication process of a network service in this embodiment, various methods can be used. For example, a method corresponding to OAuth is used.

In OAuth, the access right to a network service is represented by an access token. In the service authentication process, a user permits the access to his/her own resource (account) on a network service, thereby receiving an issue of an access token from the network service.

In OAuth, a device that receives authentication of a service is referred to as Consumer, and a device that performs an authentication process on the side of a network service and issues an access token is referred to as Service Provider. In this embodiment, the server 100 corresponds to Consumer, and the network service 200 corresponds to Service Provider.

As shown in FIG. 6, first, the device 300 requests the server 100 serving as Consumer to use the resource on the network service 200 serving as Service Provider (obtain an access right) (same figure (1)).

The server 100 receives the request and requests the network service 200 to perform authentication (same figure (2)).

When receiving the authentication request from the server 100, the network service 200 confirms whether or not a user of the device 300 permits the above-mentioned authentication (obtaining of access right) (same figure (3)).

When the user notifies the permission to the network service 200 via the device 300 (same figure (4)), the network service 200 issues an access token for the server 100 (same figure (5)).

Figure 8:
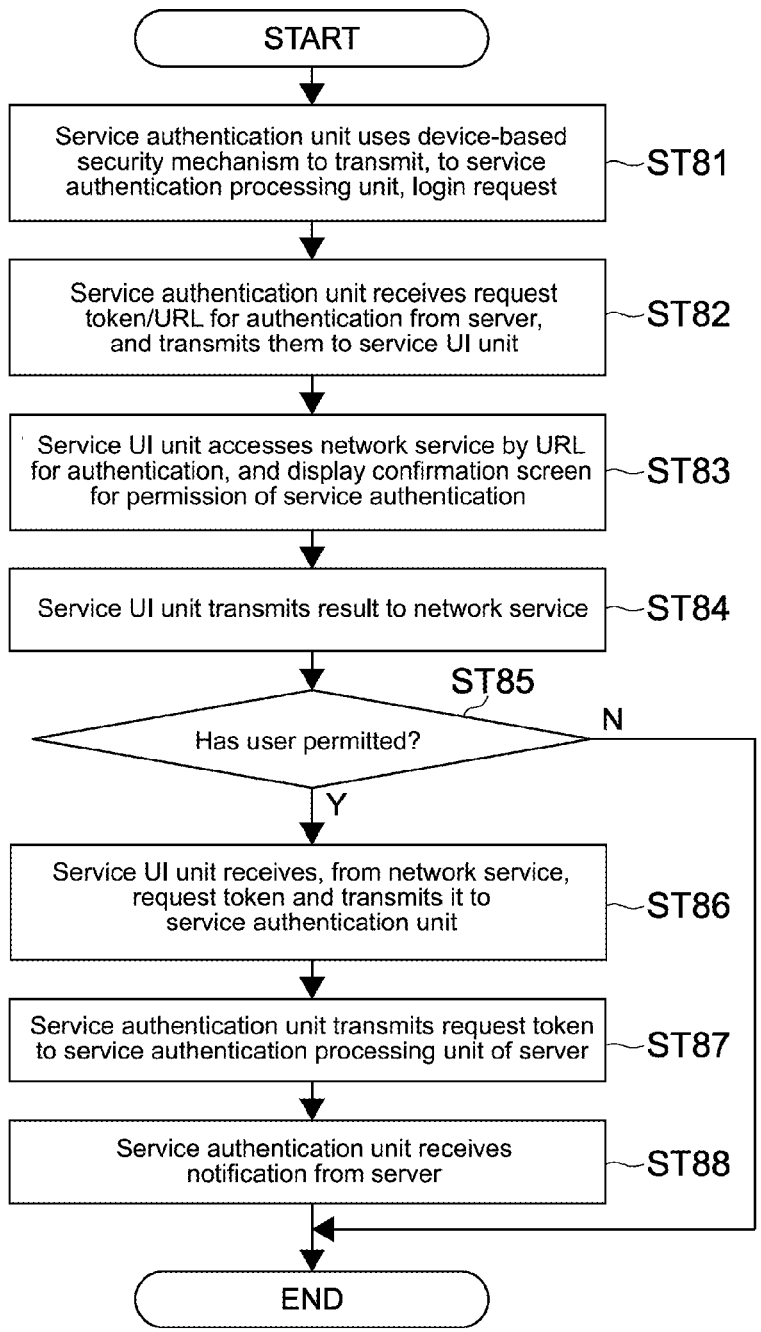
FIG. 8 A flowchart showing a flow of a network service authentication process performed by the device in the first embodiment.

Then, the server 100 uses the issued access token to call the resource (API) on the network service 200 (same FIG. 8 (6)).

Because the above-mentioned permission by the user uses a Web page for authentication that is prepared on the side of the network service 200, a browser is used as a UI module on the side of the device 300. When service authentication is performed actually, not all devices can perform authentication because it is assumed that a browser is installed on a user device.

Figure 7:
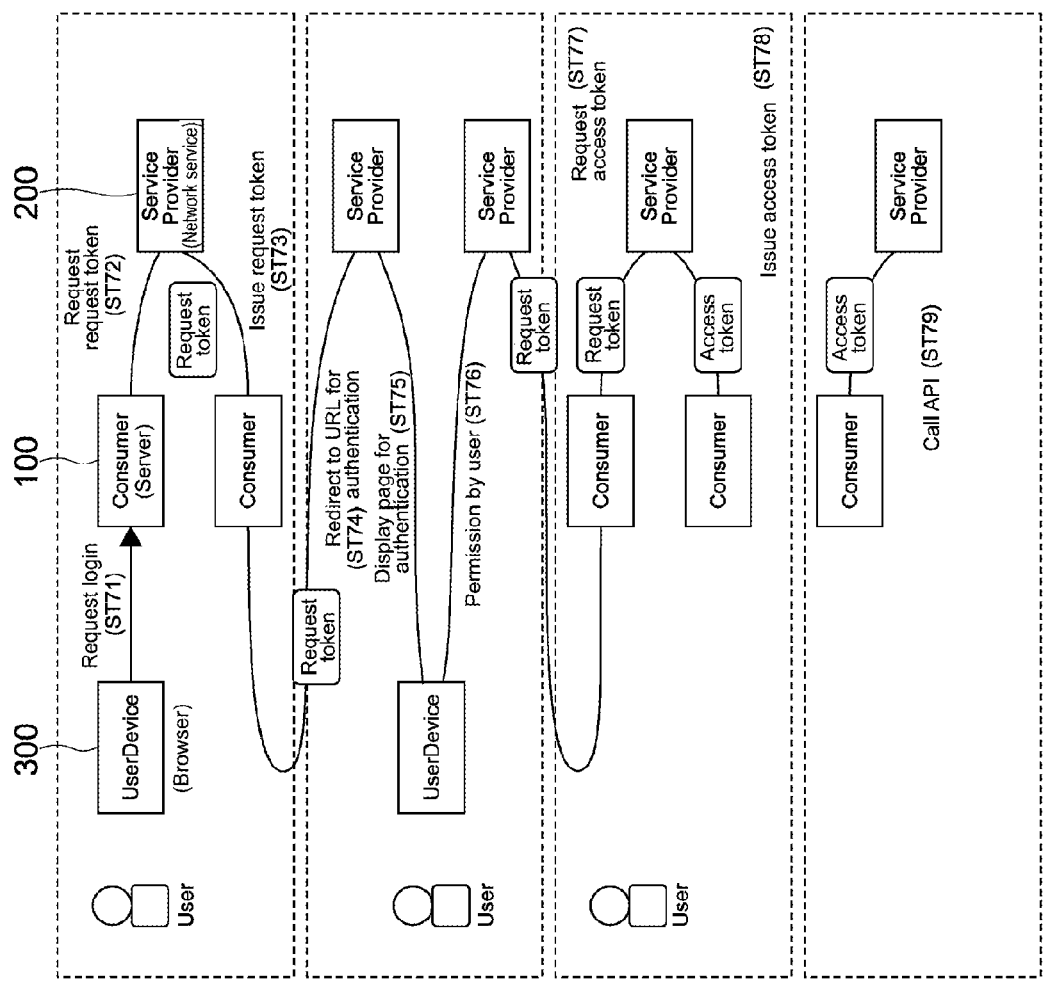
FIG. 7 A sequence diagram showing a flow of the network service authentication in the first embodiment.

The above-mentioned service authentication process will be described in more detail. FIG. 7 is a sequence diagram showing a flow of the network service authentication. Moreover, FIG. 8 is a flowchart showing a flow of a network service authentication process in the device 300. Moreover, FIG. 9 is a flowchart showing a flow of a network service authentication process in the server 100.

These processes assume that a safe communication path is established between the server 100 and the device 300 by the above-mentioned device-based security mechanism.

First, the service authentication unit 326 of the device 300 uses the above-mentioned device-based security mechanism to transmit, to the service authentication processing unit 123 of the server 100, a login request to the network service 200 (Step 71 of FIG. 7, Step 81 of FIG. 8).

Figure 9:
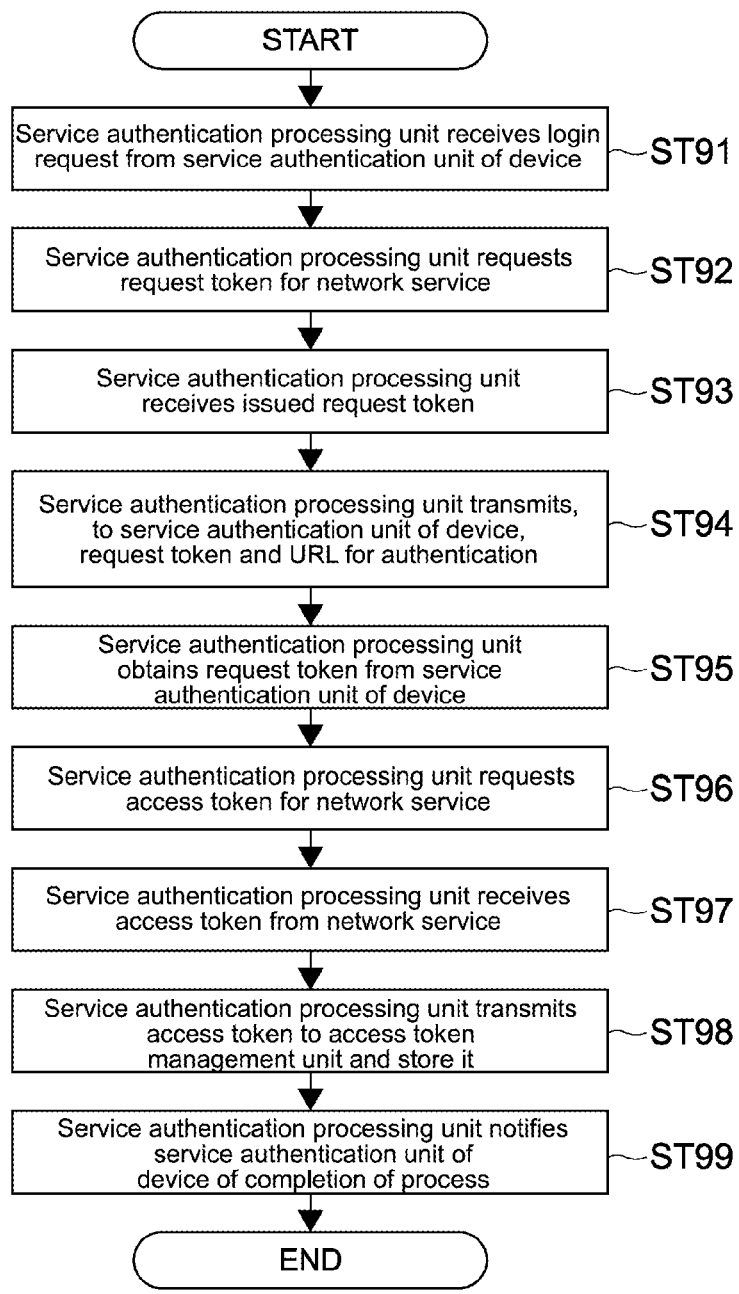
FIG. 9 A flowchart showing a flow of a network service authentication process performed by the server in the first embodiment.

When receiving the login request (Step 91 of FIG. 9), the service authentication processing unit 123 of the server 100 requests a request token for the network service 200 (Step 72 of FIG. 7, Step 92 of FIG. 9).

The network service 200 that has received the above-mentioned request for the request token issues a request token (unpermitted) for the service authentication processing unit 123 of the server 100 (Step 73 of FIG. 7).

When receiving the above-mentioned issued request token (Step 93 of FIG. 9), the service authentication processing unit 123 of the server 100 transmits, to the service authentication unit 326 of the device 300, the request token and URL to service authentication page (redirects the device 300 to the URL) (Step 74 of FIG. 7, Step 94 of FIG. 9).

The service authentication unit 326 of the device 300 receives the above-mentioned request token and the URL for authentication, and transmits them to the service UI unit 341 (Step 82 of FIG. 8).

The service UI unit 341 accesses the network service 200 by the URL for authentication (Step 74 of FIG. 7), and causes the display unit 36 to display a confirmation screen for permission of service authentication by a browser (Step 75 of FIG. 7, Step 83 of FIG. 8).

When accessing the URL for authentication, the user is requested to input a user ID and password from the network service 200. When the user inputs the user ID and password via a browser and user authentication succeeds, the above-mentioned confirmation screen is displayed.

That is, in the network service authentication process, the exchange of the user ID and password is directly performed between the device 300 and the network service 200. Therefore, it is prevented that the server 100 obtains the user ID/password and stores and use them illegally.

When receiving the operation of selecting permission/prohibition from the user on the confirmation screen, the service UI unit 341 transmits the result to the network service 200 (Step 76 of FIG. 7, Step 84 of FIG. 8).

In the case where the user gives permission on the above-mentioned confirmation screen (Yes in Step 85 of FIG. 8), the service UI unit 341 receives, from the network service 200, a request token that represents "permitted" and transmits it to the service authentication unit 326 (Step 86 of FIG. 8).

The service authentication unit 326 transmits the received request token to the service authentication processing unit 123 of the server 100 (Step 87 of FIG. 8).

When receiving the above-mentioned request token from the service authentication unit 326 of the device 300 (Step 95 of FIG. 9), the service authentication processing unit 123 of the server 100 requests a access token for the network service 200 based on it (Step 77 of FIG. 7, Step 96 of FIG. 9).

The network service 200 issues an access token for the service authentication processing unit 123 of the server 100 (Step 78 of FIG. 7) in response to the above-mentioned request for access token, and the service authentication processing unit 123 receives the issued access token (Step 97 of FIG. 9).

The service authentication processing unit 123 that has received the access token transmits the access token to the access token management unit 112, associates it with a user ID and service ID, and causes the storage unit 18 to store it (Step 98 of FIG. 9).

Then, the service authentication processing unit 123 notifies the service authentication unit 326 of the device 300 of completion of the service authentication process (access token obtaining process) (Step 99 of FIG. 9).

The service authentication unit 326 of the device 300 receives the above-mentioned process completion notification (Step 88 of FIG. 8).

(Access Process to Network Service)

Next, the access process to the network service 200 using the access token obtained by the above-mentioned network service authentication will be described.

Figure 10:
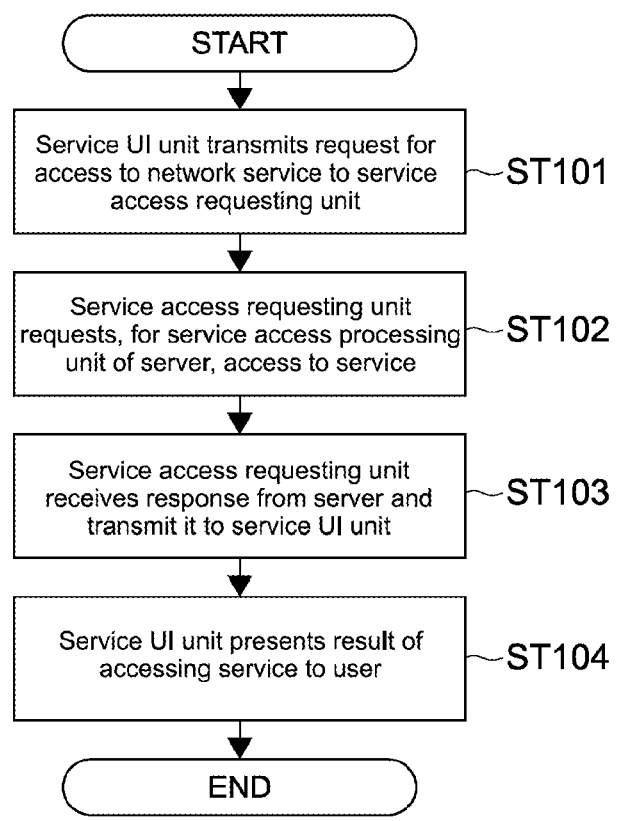
FIG. 10 A flowchart showing a flow of an access process to a network service performed by the device in the first embodiment.
Figure 11:
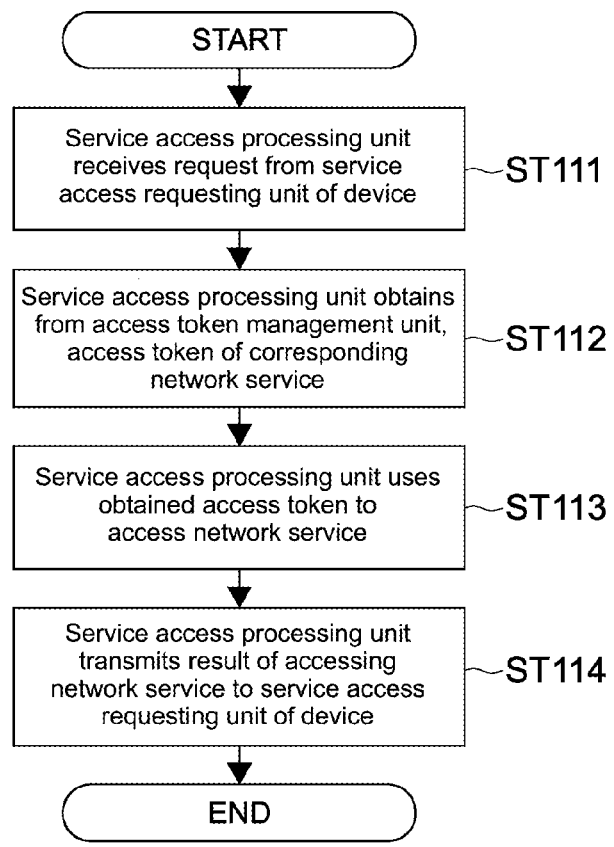
FIG. 11 A flowchart showing a flow of an access process to a network service performed by the server in the first embodiment.

FIG. 10 is a flowchart showing a flow of an access process to a network service by the device 300. Moreover, FIG. 11 is a flowchart showing a flow of an access process to a network service by the server 100.

In this case, the device 300 may be a device that is engaged in the above-mentioned network service authentication process, or may be another device that is not engaged in the authentication process and is connected to the above-mentioned device that is engaged in the authentication process by the device-based security mechanism. In addition, the device 300 may include the display unit 36 or the operation receiving unit 37 for a browser that is necessary for the above-mentioned service authentication process (e.g., PC and smartphone), or does not need to include them (e.g., digital photo frame and healthcare device).

First, the service UI unit 341 of the device 300 receives a request for access to a network service from a user, and transmits it to the service access requesting unit 327 (Step 101 of FIG. 10).

The service access requesting unit 327 that has received the above-mentioned access request transmits, to the service access processing unit 124 of the server 100, the request for access to the network service 200 together with the user ID (Step 102 of FIG. 10).

When receiving the above-mentioned access request (Step 111 of FIG. 11), the service access processing unit 124 of the server 100 obtains, from the access token management unit 112, the access token corresponding to the above-mentioned user ID that is stored in the storage unit 18 (Step 112 of FIG. 11).

Next, the service access processing unit 124 uses the obtained access token to access the network service 200 (Step 113 of FIG. 11).

Then, the service access processing unit 124 transmits the result of accessing the network service 200 (e.g., API) to the service access requesting unit 327 of the device 300 (Step 114 of FIG. 11).

The service access requesting unit 327 of the device 300 receives the above-mentioned access result, and transmits it to the service UI unit 341 (Step 103 of FIG. 10).

Then, the service UI unit 341 presents the above-mentioned access result to the user via the display unit 36 (Step 104 of FIG. 10).

Conclusion

As described above, in this embodiment, the server 100 safely stores the access token obtained from the network service 200 in the server 100 in response to the request from the device 300.

Then, the security between the server 100 and the device 300 and between the plurality of devices 300 is protected by the above-mentioned device-based security mechanism without inputting a set of a user ID/password, and the association of a user with the device 300 is performed without a user authentication process in the device 300.

Therefore, if user authentication of the network service 200 is performed on any one of the devices 300 by the above-mentioned network service authentication process, another device 300 that is associated on the device-based security mechanism can use the access token that is obtained by the server 100 and is stored.

This represents that the user can freely use the service without inputting the ID/password of the network service 200 for each device 300 to be used many times.

Moreover, in the user authentication of the network service 200, a UI function of inputting an ID/password or notifying the intention of permission (e.g., pressing of OK button) is needed on the device 300 when obtaining of an access token is permitted. In this embodiment, however, user authentication needs to be performed in only any one of the devices 300. Therefore, also the device 300 that has no UI function (input device of character or operation, and output device of UI) of inputting an ID/password or pressing a button can use the network service 200.

Second Embodiment

Next, a second embodiment of the present technology will be described. In this embodiment, parts that are not particularly described have the same configuration as the above-mentioned first embodiment. Moreover, in this embodiment, parts having the same function and configuration as those of the above-mentioned first embodiment will be denoted by the same reference numerals and a description thereof will be omitted or simplified.

In the above-mentioned first embodiment, the access to the network service 200 using the access token obtained by the server 100 is performed always via the server 100. In general, however, because the access to the network service 200 tends to be performed sequentially through some service APIs provided by the network service 200, it is not effective to perform the access via the server 100 for each time.

On the other hand, by the above-mentioned device-based security mechanism, the security managers of the plurality of devices 300 and the server 100 can be regarded as one system in cooperation with each other by code communication. In view of the above, in this embodiment, the device 300 temporarily obtains the access token managed on the side of the server 100, and uses it to directly access the network service 200.

[Module Configuration of Server and Device]

Figure 12:
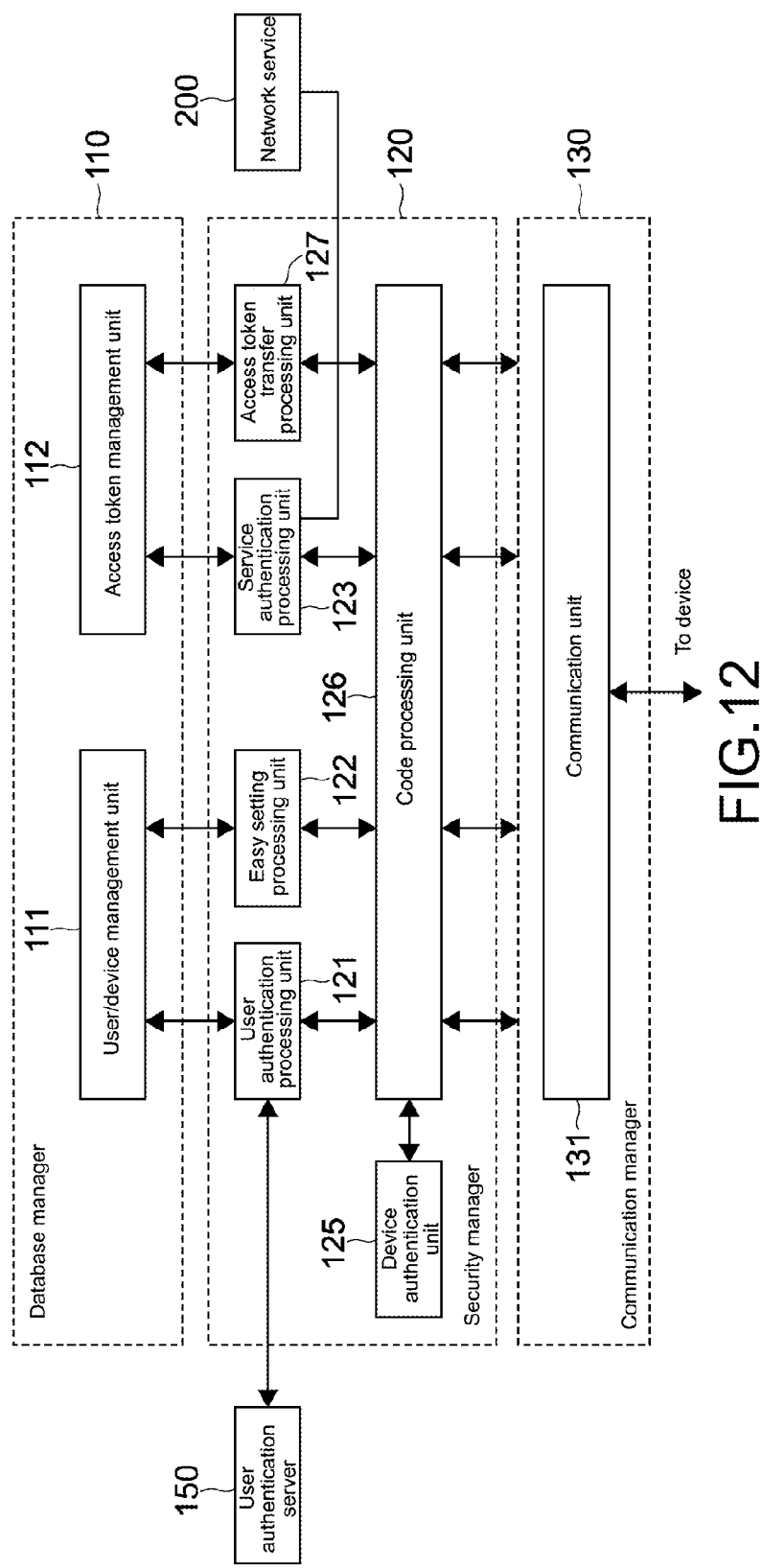
FIG. 12 A block diagram showing a software module configuration of a server in a second embodiment.

FIG. 12 is a block diagram showing a software module configuration of the server 100 in this embodiment. On the other hand, FIG. 13 is a block diagram showing a software module configuration of the device 300 in this embodiment.

As shown in FIG. 12, in order to achieve the above-mentioned direct access from the device 300 to the network service 200, in this embodiment, the server 100 includes an access token transfer processing unit 127 instead of the service access processing unit 124 in the first embodiment.

Figure 13:
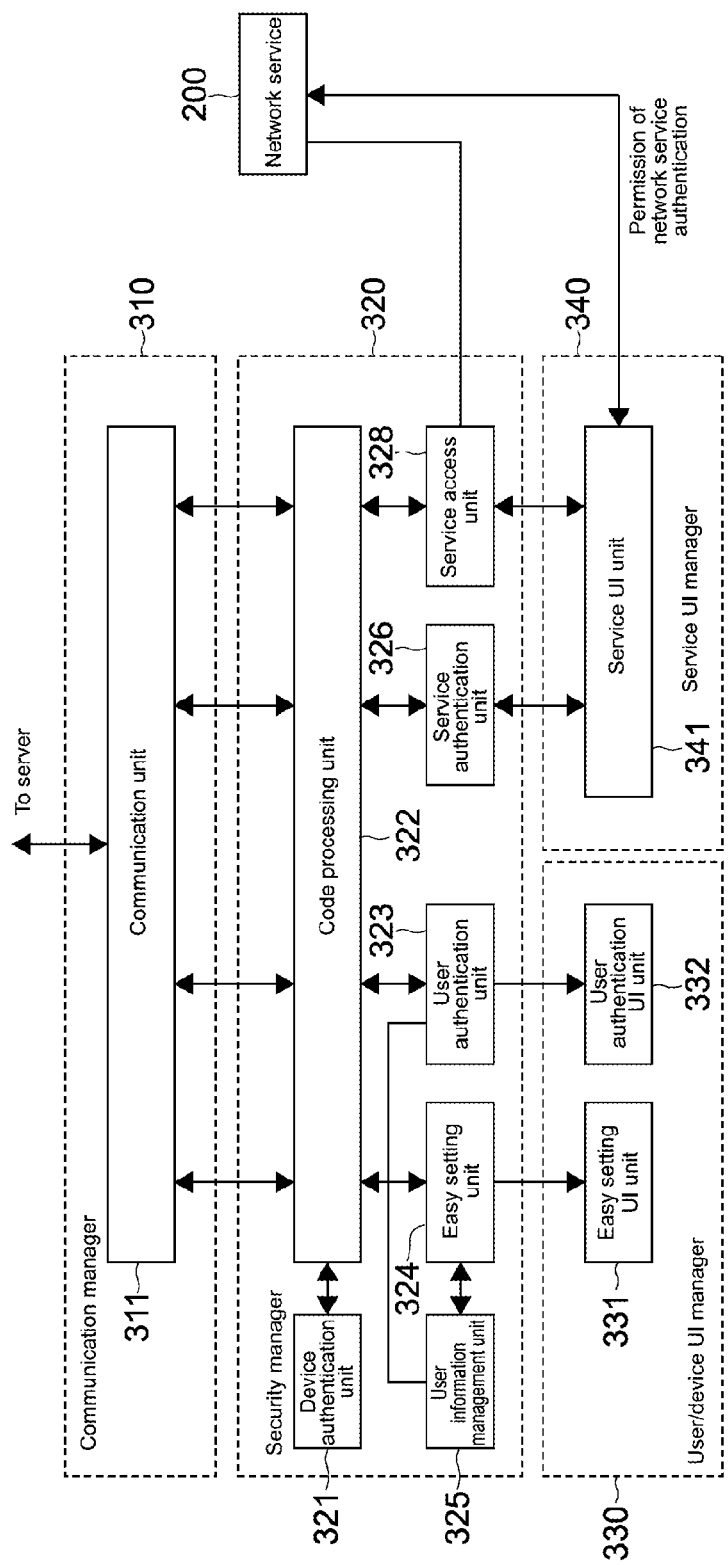
FIG. 13 A block diagram showing a software module configuration of a device in the second embodiment.

On the other hand, as shown in FIG. 13, in this embodiment, the device 300 includes a service access unit 328 instead of the service access requesting unit 327 in the first embodiment.

The access token transfer processing unit 127 of the server 100 obtains an access token from the access token management unit 112 in accordance with a request from the device 300, and transfers it to the device 300.

The service access unit 328 of the device 300 obtains an access token that is managed on the side of the server 100, and uses it to directly access the network service 200

[Operation of System]

Next, the operation of the server 100 and device in this embodiment will be described. The network service authentication process is the same as that of the above-mentioned first embodiment.

(Access Process to Network Service)

Figure 14:
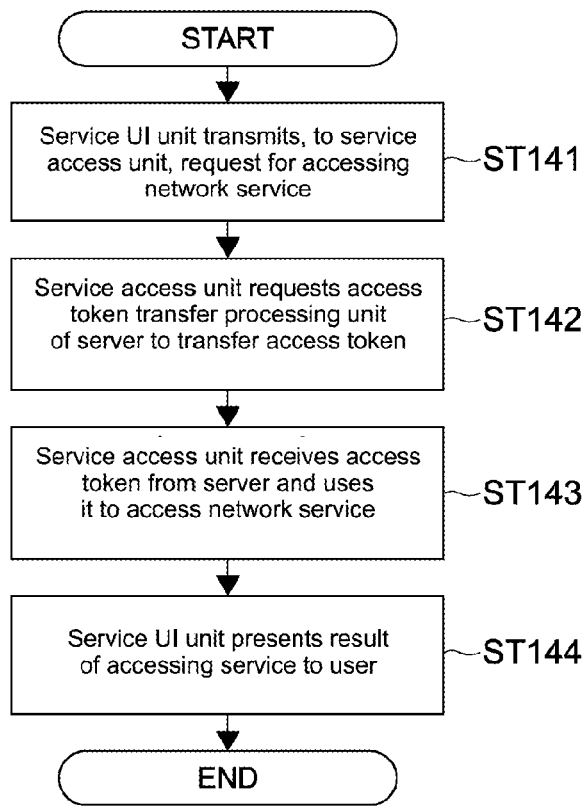
FIG. 14 A flowchart of a flow of an access process to a network service performed by the device in the second embodiment.

FIG. 14 is a flowchart showing a flow of an access process to a network service by the device 300 in this embodiment. On the other hand, FIG. 15 is a flowchart showing a flow of an access process to a network service by the server 100 in this embodiment.

First, the service UI unit 341 of the device 300 receives, from a user, a request for accessing a network service, and transmits it to the service access unit 328 (Step 141 of FIG. 14).

The service access unit 328 that has received the access request transmits, to the access token transfer processing unit 127 of the server 100, a request for transferring an access token together with a user ID and service ID (Step 142 of FIG. 14).

Figure 15:
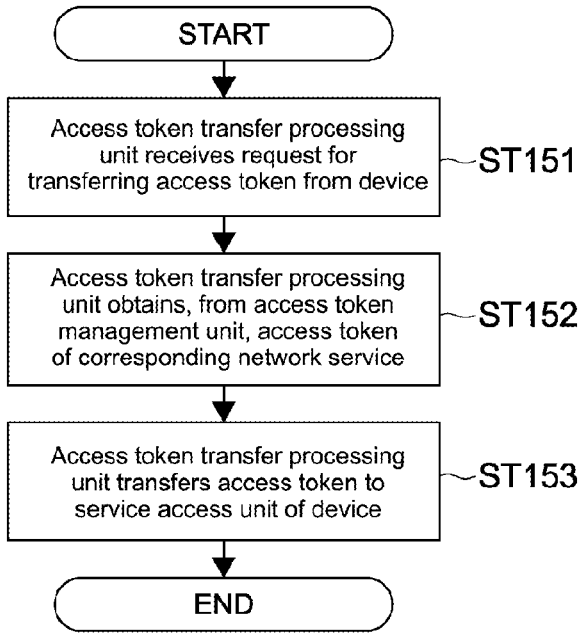
FIG. 15 A flowchart of a flow of an access process to a network service performed by the server in the second embodiment.

When receiving the transfer request (Step 151 of FIG. 15), the access token transfer processing unit 127 of the server 100 obtains, from the access token management unit 112, an access token to the network service 200 corresponding to the user ID and service ID (Step 152 of FIG. 15).

Then, the access token transfer processing unit 127 transfers the obtained access token to the service access unit 328 of the device 300, which is a transfer request source (Step 153 of FIG. 15).

When receiving the access token from the server 100, the service access unit 328 of the device 300 uses it to access the network service 200 and transmits the access result to the service UI unit 341 (Step 143 of FIG. 14).

Then, the service UI unit 341 presents the above-mentioned result of accessing the network service 200 to the user via the display unit 36 (Step 144 of FIG. 14).

Conclusion

As described above, according to this embodiment, the device 300 can temporarily obtain the access token managed on the side of the server 100, and use it to directly access the network service 200. Accordingly, it is possible to improve the access efficiency to the network service 200 and to reduce the burden on the server 100.

Modified Example

The present technology is not limited to only the above-mentioned embodiments and various modifications can be made without departing from the gist of the present technology.

In the above-mentioned first and second embodiments, the storage location of the access token obtained by the server 100 is the storage unit 18 in the server 100 (the access token management unit 112). However, the access token may be stored in another storage apparatus on cloud, which is physically distant from the server 100, as long as the security is ensured.

In the above-mentioned second embodiment, the device 300 obtains, from the server 100, the access token every time the device 300 accesses the network service 200. However, the device 300 may retain, in the RAM 33 or the storage unit 38, the access token obtained from the server 100 once for a predetermined time period. Then, the device 300 may use it again in the case where a user requests a network service access for which the same access token as the retained one is needed.

In the above-mentioned first and second embodiments, for communication between the devices 300 and between the device 300 and the server 100, the device-based security mechanism is used. However, the device-based security mechanism does not need to be used in the case where the security is ensured by another means.

The techniques in the above-mentioned first and second embodiments can be executed independently, and can be executed in any combination as long as they do not contradict each other.

[Others]

The present technology may also take the following configurations.

(1) An information processing apparatus, including
a communication unit capable of communicating with a first device, a second device, and a service on a network, the service having a resource on a user of the first device,
a storage unit, and
a controller capable of controlling
the communication unit so that the communication unit transmits, based on a request for obtaining an access right to the resource from the first device and permission information representing permission by the user with respect to the obtaining of the access right, a request for issuing an access token to the service, the access token representing the access right, and receives, from the service, the access token issued by the service, and
the storage unit so that the storage unit stores the received access token safely.

(2) The information processing apparatus according to (1) above, in which
the controller controls the communication unit so that the communication unit accesses the resource using the stored access token in response to a request from the second device associated with the user.

(3) The information processing apparatus according to (1) or (2) above, in which
the controller controls the communication unit so that the communication unit transmits the stored access token to the first device or the second device through a safe communication path.

(4) The information processing apparatus according to (1) to (3) above, in which
the first device includes an input device to which an operation necessary for the user to notify intention of the permission to the service is input and an output device that outputs a screen for the input, and
the second device does not include the input device and the output device.

(5) The information processing apparatus according to any one of (1) to (4) above, in which
the controller controls
the communication unit so that the communication unit receives, from the first device, association information that represents association with the user, the first device, and the second device, and
the storage unit so that the storage unit stores the received association information.

DESCRIPTION OF REFERENCE NUMERALS 11, 31 CPU
13, 33 RAM
18, 38 storage unit
19, 39 communication unit
36 display unit
37 operation receiving unit
50 WAN
100 server
112 access token management unit
123 service authentication processing unit
124 service access processing unit
127 access token transfer processing unit
131 communication unit
150 user authentication server
200 (200A, 200B, 200C) network service
300 (300A, 300B, 300C) device
311 communication unit
326 service authentication unit
327 service access requesting unit
328 service access unit
341 service UI unit

The invention claimed is:

1. An information processing apparatus, comprising:
a communication unit configured to communicate with a first device, a second device, and a service on a network, wherein the service includes a resource on the first device;
a storage unit; and
a processor configured to control the communication unit to:
transmit a first request for issuance of a first request token to the service, wherein the first request is transmitted based on reception of a second request from the first device, wherein the second request is to obtain an access right to the resource;
transmit the first request token received from the service to the first device;
receive a second request token from the first device based on reception of the first request token by the first device and a permission information that represents permission by a user to obtain the access right to the resource,
transmit a third request for issuance of an access token to the service, wherein the third request is transmitted based on the received second request token, wherein the access token represents the access right;
receive, from the service, the access token issued by the service;
control the storage unit to store the received access token;
and access the resource based on the received access token.

2. The information processing apparatus according to claim 1, wherein the processor is further configured to control the communication unit to access the resource based on the stored access token and a fourth request received from the second device associated with the user.

3. The information processing apparatus according to claim 1, wherein the processor is further configured to control the communication unit to transmit the stored access token to the first device or the second device through a communication path.

4. The information processing apparatus according to claim 1, wherein the first device includes:
an input device to which an user operation to notify intention of the permission to the service is input; and
an output device that outputs a screen for the user operation, and
wherein the input device and the output device are absent in the second device.

5. The information processing apparatus according to claim 2, wherein the processor is further configured to control:
the communication unit to receive, from the first device, an association information that represents association of the user with the first device and the second device; and
the storage unit to store the received association information.

6. An information processing system, comprising:
a server apparatus, including:
  a first communication unit configured to communicate with a user device and a service on a network, wherein the service includes a resource on the user device;
  a storage unit; and
  a first processor configured to control the first communication unit to:
    transmit a first request for issuance of a first request token to the service, wherein the first request is transmitted based on reception of a second request from the user device, wherein the second request is to obtain an access right to the resource;
    transmit the first request token received from the service to the user device;
    receive a second request token from the user device based on reception of the first request token by the user device and a permission information that represents permission by a user to obtain the access right to the resource;
    transmit a third request for issuance of an access token to the service, wherein the third request is transmitted based on the received second request token, wherein the access token represents the access right;
    receive, from the service, the access token issued by the service; and
    control the storage unit to store the received access token; and
an information processing apparatus, including:
  a second communication unit configured to communicate with the server apparatus and the service; and
  a second processor configured to control the second communication unit to:
    receive the stored access token from the server apparatus through a communication path; and
    access the resource based on the received access token.

7. An information processing method, comprising:
receiving, from a first device, a first request for obtaining an access right to a resource of a service on a network;
transmitting, to the service, a second request for issuing a first request token, wherein the second request is transmitted based on reception of the first request from the first device;
transmitting, to the first device, the first request token received from the service;
receiving, from the first device, a second request token based on reception of the first request token by the first device and a permission information that represents permission by a user to obtain the access right to the resource;
transmitting, to the service, a third request for issuing an access token, wherein the third request is transmitted based on the received second request token, wherein the access token represents the access right;
receiving, from the service, the access token issued by the service;
storing the received access token;
and accessing the resource based on the received access token.

8. A non-transitory computer-readable medium having stored thereon, computer-executable instructions that when executed by an information processing apparatus, cause the information processing apparatus to execute operations, the operations comprising:
receiving, from a first device, a first request for obtaining an access right to a resource of a service on a network;
transmitting, to the service, a second request for issuing a first request token, wherein the second request is transmitted based on reception of the first request from the first device;
transmitting, to the first device, the first request token received from the service;
receiving, from the first device, a second request token based on reception of the first request token by the first device and a permission information that represents permission by a user to obtain the access right to the resource;
transmitting, to the service, a third request for issuing an access token representing the access right, wherein the third request is transmitted based on the received second request token;
receiving, from the service, the access token issued by the service;
storing the received access token;
and accessing the resource based on the received access token.

9. The information processing apparatus according to claim 1, wherein the processor is further configured to control the communication unit to receive, from the first device, an association information that represents association of the user with the first device and the second device, wherein the association information ensures safety based on the access token that is transmitted in response to a fifth request from the second device associated with the first device.

10. The information processing system according to claim 6, wherein the user device includes:
  an input device to which an user operation to respond to a confirmation request transmitted by the service is input; and
  an output device configured to output a screen to receive the user operation, wherein the confirmation request is in a form of a confirmation screen displayed on the output device.

11. The information processing apparatus according to claim 1, wherein the first device receives the second request token from the service based on the transmission of the first request token and the permission information to the service from the first device.

12. The information processing system according to claim 6, wherein the user device receives the second request token from the service based on the transmission of the first request token and the permission information to the service from the user device.

* * * * *